US006760601B1

(12) United States Patent
Suoknuuti et al.

(10) Patent No.: US 6,760,601 B1
(45) Date of Patent: Jul. 6, 2004

(54) APPARATUS FOR PROVIDING INFORMATION SERVICES TO A TELECOMMUNICATION DEVICE USER

(75) Inventors: Marko Suoknuuti, Helsinki (FI); Heikki Rautila, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/450,200

(22) Filed: Nov. 29, 1999

(51) Int. Cl.[7] .............................................. H04Q 7/20
(52) U.S. Cl. ................. 455/557; 455/414.1; 379/90.01
(58) Field of Search ................................ 455/414, 554, 455/556, 557, 558, 466, 412, 41, 422, 74, 456, 560, 561, 445; 379/90.01, 224, 93, 419, 201.01, 198, 201.1, 207.12, 207.14, 221.11, 265.02; 709/203, 250, 231, 206, 207, 218, 217; 370/400, 401, 404

(56) References Cited

U.S. PATENT DOCUMENTS

| | | | |
|---|---|---|---|
| 5,109,399 A | | 4/1992 | Thompson |
| 5,796,394 A | * | 8/1998 | Wicks et al. ................. 345/751 |
| 5,805,591 A | * | 9/1998 | Naboulsi et al. ......... 370/395.6 |
| 5,901,359 A | | 5/1999 | Malmstrom |
| 5,983,090 A | * | 11/1999 | Aoki .......................... 370/329 |
| 6,044,403 A | * | 3/2000 | Gerszberg et al. .......... 709/217 |
| 6,125,177 A | * | 9/2000 | Whittaker .................... 379/243 |
| 6,151,628 A | * | 11/2000 | Xu et al. ...................... 709/225 |
| 6,161,007 A | * | 12/2000 | McCutcheon et al. ...... 455/412 |
| 6,163,536 A | * | 12/2000 | Dunn et al. .................. 370/352 |
| 6,167,120 A | * | 12/2000 | Kikinis ..................... 379/90.01 |
| 6,229,804 B1 | * | 5/2001 | Mortsolf et al. ............ 370/352 |
| 6,289,212 B1 | * | 9/2001 | Stein et al. .................. 455/412 |
| 6,289,377 B1 | * | 9/2001 | Lalwaney et al. .......... 709/222 |
| 6,317,831 B1 | * | 11/2001 | King ........................... 380/223 |
| 6,320,883 B1 | * | 11/2001 | Mitchell et al. ............ 370/522 |
| 6,321,257 B1 | * | 11/2001 | Kotola et al. ............... 455/422 |
| 6,337,858 B1 | * | 1/2002 | Petty et al. .................. 370/356 |
| 6,339,761 B1 | * | 1/2002 | Cottingham .................. 705/14 |
| 6,446,064 B1 | * | 9/2002 | Livowsky ....................... 707/5 |
| 6,463,468 B1 | * | 10/2002 | Buch et al. .................. 709/219 |

FOREIGN PATENT DOCUMENTS

| | | | |
|---|---|---|---|
| EP | 0797 368 A2 | 3/1997 | |
| EP | 0797368 A2 | 9/1997 | ............ H04Q/7/22 |
| WO | WO 97/46073 | 12/1997 | |
| WO | 98/36585 | 2/1998 | |
| WO | WO98/36585 | 8/1998 | ............ H04Q/3/00 |
| WO | WO 98/49817 | 11/1998 | |
| WO | WO 99/05830 | 2/1999 | ............ H04L/12/64 |
| WO | WO 99/46890 | 9/1999 | |
| WO | WO 99/48312 | 9/1999 | ............ H04Q/7/30 |
| WO | WO 00/35176 | 6/2000 | |

OTHER PUBLICATIONS

Albrecht M. et al. "IP Services Bluetooth: Leading the Way to a New Mobility", Proceedings Annual Conference On Local Computer Networks. LCN, 1999, Xp001001314 p. 6, col. 1, line 39 –p. 9, col. 1, line 4.

Camp Michael T. : "WAP and Bluetooth Technologies Beyond Cable Replacement" Bluetooth Signal (The Official Newsletter of the Bluetooth Special Interest Group), No. 3, Nov. 1999, pp. 3 XP002171357.

Moran Paul J.: "Throughts on Bluetooth LAN Access Points" Bluetooth Signal (The Official Newsletter of the Bluetooth Special Interest Group), No. 3, Nov. 1999, p. 4 XP002171358.

* cited by examiner

Primary Examiner—Jean Gelin
(74) Attorney, Agent, or Firm—Cohen, Pontani, Lieberman & Pavane

(57) ABSTRACT

An apparatus for providing information services to a user includes a microserver disposed at the user's home or office. The microserver is connected to a communication network which is connected to a global computer network, and the user's mobile or fixed telephone terminal. At least one service server is connected to the user's mobile or fixed terminal via the global computer network, the communication network and the microserver. Through the disposition of microserver at the user's primary location, the service server can transmit general or user specific service information to the user via their mobile and/or fixed terminal. The problems of localization of the user are eliminated by the implementation of the microsever at the user's primary communication location.

55 Claims, 2 Drawing Sheets

APPARATUS FOR PROVIDING INFORMATION SERVICES TO A TELECOMMUNICATION DEVICE USER

BACKGROUND OF THE INVENTION

1. Field of the Invention

The present invention relates to communication systems, and more particularly, to an apparatus for providing information/data services to a telecommunication device user from data networks.

2. Description of the Related Art

European Patent No. 0797368 discloses a telecommunication system and radio base station and portable telecommunication terminal thereof. In that system, information is stored in the base station (i.e., cells), which determines the minimum localization range of the portable/mobile telephone. Generally, in any given case, this range is equivalent to the cell size, and in some instances may be as large as 35 sq. km. Thus, it is clear that user localization is somewhat indeterminable, which results in the inability to use or even provide services to a mobile terminal user that require precise location information. Only when a call is placed to the mobile terminal can the stored information be transmitted to the mobile terminal from the base station. The information storage in this system is limited to the telecommunication operator's telecommunication network, thereby resulting in a limitation on the ability to provide additional services to the mobile terminal user. In addition, the inability to accurately locate the mobile terminal coupled with the fact that there is no connection between data networks and the communication network prevents the direct sending of data services to the mobile terminal user.

PCT Patent Publication No. WO 98/36585 discloses a sponsored call and cell service that suffers from the same previously mentioned localization and information storage problems, and lack of connection to data networks to enable it to provide data services to the end user/subscriber. In accordance with the disclosed system, subscriber location is determined when the subscriber makes an outgoing call. This, however, results in a determination as to the cell location of the mobile user and does not provide any more accurate localization of the user. As mentioned previously, the cell size can be up to 35 sq. km.

SUMMARY OF THE INVENTION

It is therefore an object of the present invention to provide an apparatus that enables more accurate localization of a user's location and thereby enable services to be provided to the user via his telecommunication terminal without requiring the user to make an outgoing call in order to receive such services.

A further object of the present invention is to provide an apparatus for providing information/data services to a telecommunication device user where a connection exists between the data networks providing the services and the communication network to which the user is connected.

It is yet another object of the present invention to provide an apparatus that is capable of storing service data intended for a particular user provided from a service provider in a device that is not part of the user's mobile telephone network (i.e., base station, MSC, etc.).

In accordance with a preferred embodiment the apparatus of the present invention includes at least one service provider having a service server connected to a global computer network, such as, for example the internet. A public switching telephone network is connected to the global computer network and provides a connection to the user's home or office location. An interface device, such as a microserver, is connected to the public switching telephone network at the user's home or office and to the user's wireless mobile terminal and/or their wired fixed terminal.

Once the interface device is connected as described, the service provider can send service information to the user which is received and stored in the interface device. The interface device provides the stored information to the user at a user set appropriate time, such as, for example, before or during a user call, or when the user activates the mobile telephone or fixed telephone to make an outgoing or receive an incoming call.

The interface device is provided with a wireless communication protocol, such as bluetooth, to enable the wireless transmission of the received service information to the user's wireless terminal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the several views.

DETAILED DESCRIPTION OF THE PRESENTLY PREFERRED EMBODIMENTS

Figure 1:
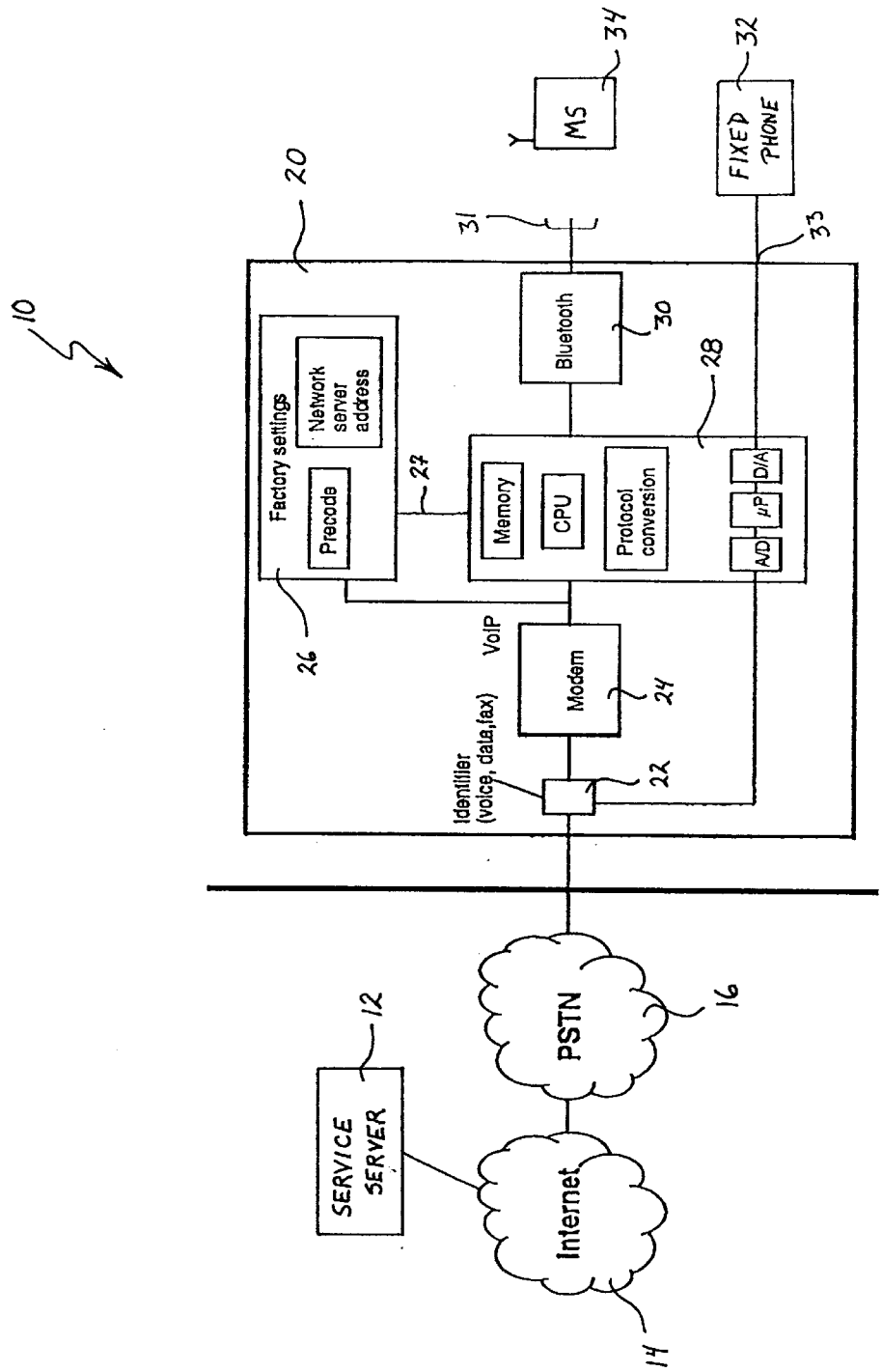
FIG. 1 is a block diagram of the communication system architecture in accordance with a preferred embodiment of the present invention.

FIG. 1 shows a preferred embodiment of the system 10 according to the present invention. A service server 12 is connected to the internet 14, or other global computer network, via a communication connection, such as for example, telephone lines, fiber optic cables, a wireless communication system, or any other suitable known communication connection. The service server 12 can be a storage device for a particular service provider, or a database of various services which can be delivered to the end user. The service server 12 is connected to the end user's mobile station/terminal (MS) 34 or fixed telephone 32 via the internet 14, a public switching telephone network (PSTN) 16 and a microserver 20. Microserver 20 includes a connection jack for connecting fixed phone 32 thereto. Microserver 20 includes a connection jack 33 for connecting fixed telephone 32 thereto. In a preferred embodiment, microserver 20 is physically located at the place where the user actually uses his telecommunication equipment (e.g., home or office). Examples of contemplated user telecommunication equipment can be a fixed or wired phone, a portal phone, or a wireless mobile phone.

In accordance with this embodiment, microserver 20 is connected to the PSTN at the user's home or office via a standard telecommunication connection, such as, for example, an RJ-45 connector, a T-base connector, fiber optics, integrated services digital network (ISDN), asymmetric digital subscriber line (ADSL) or any other known type of fixed telecommunication connection. Many other types of telecommunication connections may be employed.

In one preferred embodiment, microserver 20 is a service provider specific item that is provided to the user from the service provider (e.g., a retailer such as a shopping mall or particular vendor). The user is generally a preferred client of the service provider supplying microserver 20 to the user. Upon connection of microserver 20 to the user's home or office PSTN and respective MS 34 or fixed phone 32, the retailer may provide the user with daily, weekly, monthly or even annual information relating to that particular retailer. Optionally, the user may also be able to receive additional benefits from the retailer or service provider by participating in a microserver program.

Once microserver 20 is connected to the user's home or office, it automatically contacts the service server 12 to initiate a handshake procedure (i.e., a registration process). Upon successful completion of the handshake, service server 12 registers that microserver 20 is online and ready to receive services (e.g., advertisements, information or other functions). The registration information exchanged during this procedure includes information as to the location of microserver 20 and may also include information relating to the user such as the user's personal preference from a retail, communication, recreational or other desired perspective. By installing microserver 20 in the user's home or office, the localization problems associated with mobile telephones are eliminated and accurate location information is available. The service server 12 also sends an acknowledgment signal to the microserver 20 via the internet 14 and PSTN 16 to confirm the automatic contact. Microserver 20 transfers or routes phone calls from the user's telecommunication equipment (e.g., MS 34 or fixed phone 32) to the PSTN 16 and internet 14. This call can also be an IP call as opposed to a voice call.

The service server 12 is configured to send data to microserver 20 that is to be viewed using the MS 34. In this case, MS 34 can be a wireless application protocol (WAP), general packet radio service (GPRS) or wideband code division multiple access (WCDMA) phone/terminal. The information sent from service server 12 to microserver 20 can be, for example, text or video data to be displayed and viewed on the user's telecommunication device, or voice messages/data to be listened to by the user when using fixed phone 32 or MS 34. In a preferred embodiment, microserver 20 stores the information sent from service server 12 in a memory such as, for example, a random access memory (RAM), and provides the information to the user via their MS 34 or fixed phone 32. Since the service information can be stored in microserver 20, the user may be provided with several options as to when the service information is conveyed to the user. An example of such options is a "do not disturb" mode that is activated, for example, with the dual tone multiple frequency (DTMF) keys and which would disable the transmission of service information from the microserver 20 to the user's MS 34 or fixed phone 32 until deactivated. Once the "do not disturb" mode is deactivated, microserver 20 provides the stored service information to the user. Another example of such an option could be enabling the user to forward or send the received service information to a called party of the user's choice through the use of the DTMF keys, or even forward the received information to the user at another location, similar to call forwarding.

Alternatively, the information sent to MS 34 or fixed phone 32 may be advertisements, promotions or information services such as, for example, stock quotes, sports scores, etc., from companies doing business with the service server company or from the service server itself. The promotions can consist of retailer promotions that provide the user with a retail benefit such as a coupon or code that the user can redeem at the promoting retailer's stores. Such promotions can be provided by the retailer with a time limit on the redemption period, so that if the user does not act on the specific promotion within an allotted period of time, the promotion opportunity to the user is lost. The type of information provided to the user is unlimited, and can be for business, personal and/or recreational purposes. In addition, the information sent to MS 34 or fixed phone 32 can be updated from previously sent information from the service server 12 when the service server company has updates to report to the users of the services.

Thus, in accordance with an embodiment of the present invention, the user will be notified as to the presence of received service information when it arrives. This notification can be audible or visual and can be performed, for example, prior to the user placing a call with the MS 34 or fixed phone 32, during a call and/or after a call has been completed. Once prompted as to the presence of the service information, the user can decide whether to review the information immediately or wait until a later time. In other contemplated embodiments, the service information may be transmitted in audio and/or video form to the user and potentially to a called party (by the user) during the call.

Microserver 20 includes an identifier 22 that is directly connected with the connection to PSTN 16. Identifier 22 receives and identifies an incoming signal as voice information, data information (modem), or fax information, and/or a telephone call from a third party, and routes the received signal to the proper device within microserver 20. When the incoming call is a data or fax signal, it is routed to modem 24 which performs protocol handshakes with the calling device and establishes a point-to-point protocol (PPP) connection between the service server 12 and central processing unit (CPU) card 28 of the microserver 20. In another contemplated embodiment, modem 24 is not required when microserver 20 is connected with an integrated services digital network (ISDN) or an asymmetric digital subscriber line (ADSL) network, or other full time connection to internet 14. In this embodiment, the ADSL, ISDN or other fixed connection takes the place of PSTN 16. CPU card 28 contains a main processor (CPU), upper layers of communication protocol stacks (e.g., PPP, TCP/IP, ALF), and a memory. In addition, CPU card 28 includes interception circuits such as A/D and D/A converters as well as a microprocessor that provide a normal mode bypass for voice calls but is capable of intercepting or interrupting the voice call when the CPU wants to transmit services to the user from the service server 12 during a voice call.

The factory setting module 26 is connected to the CPU card 28 via a control/program bus 27, and stores the permanent settings of the microserver 20, such as, for example, a startup code, a network server address, user specific information and identity and any other information deemed necessary for operation of the microserver. A bluetooth radio communication module is connected to CPU card 28 and provides a protocol for wireless communication between microserver 20 and mobile station/terminal 34.

In accordance with the preferred embodiment, bluetooth protocol is part of the implementation platform for using microserver 20 with a mobile/wireless terminal 34. As is known in the art, bluetooth is an open specification for wireless communication of data and voice. It provides a universal bridge to existing data networks, a peripheral interface, and a mechanism by which small private ad hoc groupings of connected devices away from fixed network infrastructures are formed. Bluetooth is based on a low-cost short-range radio link, built into a relatively small (e.g., 9 mm$^2$) microchip. The radio link is used to facilitate protected ad hoc connections for stationary and mobile environments.

Bluetooth radio links are designed to operate in a noisy radio frequency environment. Consequently, it uses a fast acknowledgement and frequency hopping scheme to form a robust link. Use of Forward Error Correction (FEC) limits the impact of random noise on long-distance links. The encoding schemes utilized by bluetooth are optimized for uncoordinated environments. Bluetooth radios operate in an unlicensed band at about 2.4 GHz. The nominal link range for a bluetooth radio is 10 centimeters to 10 meters; however, this range can be extended up to 100 meters by appropriate increase in the transmission power.

It is to be understood that bluetooth is disclosed herein as an exemplary implementation of microserver 20 with a wireless mobile terminal 34, and that other wireless specifications such as, for example, wireless local area networks (WLAN) and WAP can be used without departing from the scope of the present invention. WAP is used here as an example of application protocol that can be implemented into the present invention.

Figure 2:
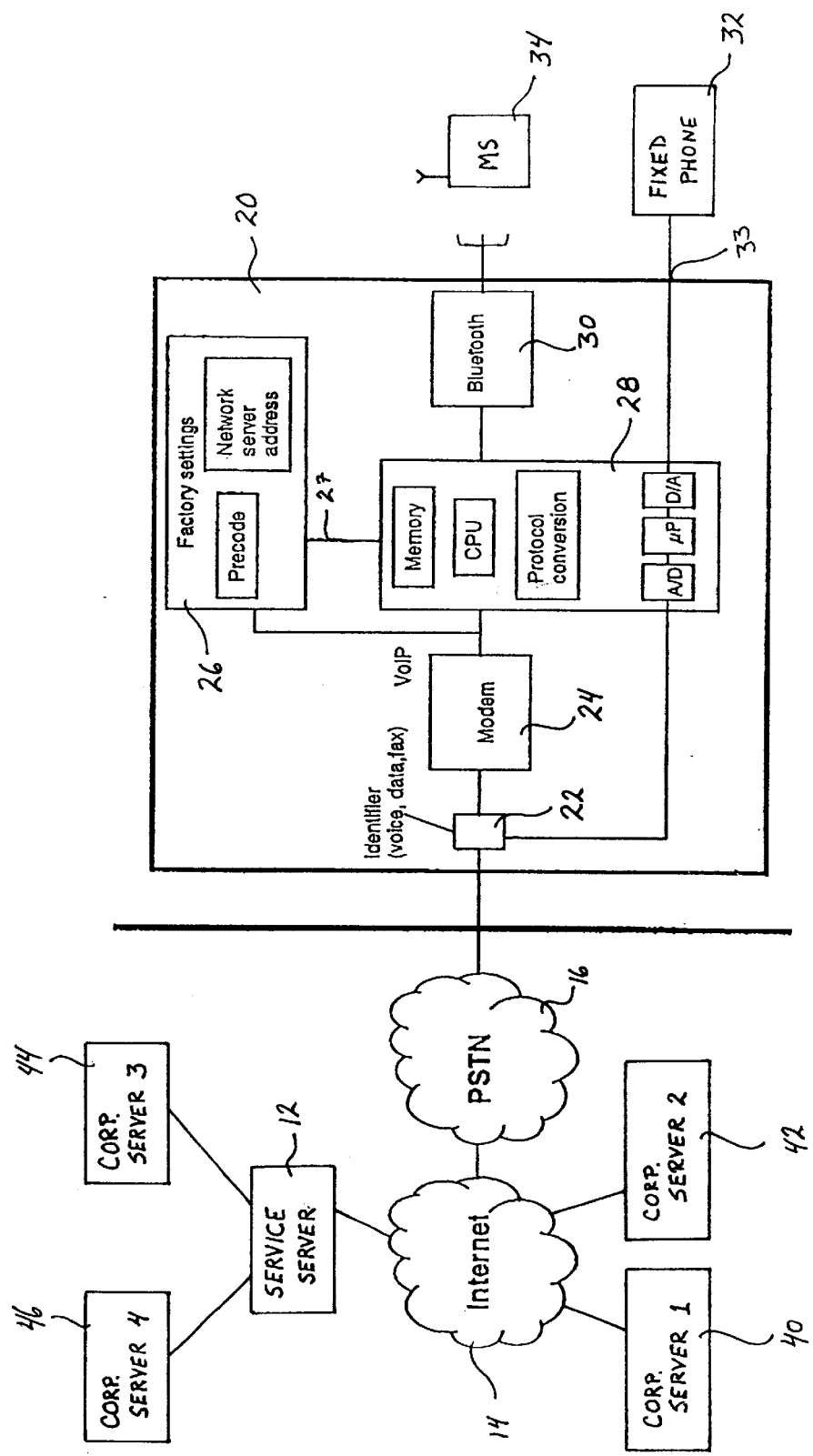
FIG. 2 is a block diagram of the communication system architecture according to an alternative embodiment of the invention.

FIG. 2 shows an alternative embodiment of the present invention where service server 12 has several corporate servers 44 and 46 connected thereto. Corporate servers 44 and 46 can be, for example, servers for corporations offering services to the end user. Examples of services provided by such corporate entities may be, fax services, email, voice mail, retailers offering products or promotional programs, recreational service providers, advertisements, etc.

In other contemplated embodiments, the corporate servers 40 and 42 can be connected directly to internet 14 and therefore would not require the intervention of service server 12. Corporate services 40 and 42 would operate as a service server by providing information services to the user via the internet 14, PSTN 16 and microserver 20.

In an exemplary operation, microserver 20 is installed by the user in their home or office, or other place in which they commonly use the telecommunication device connected to the microserver (e.g., MS 34 or fixed phone 32). Upon connection of the microserver 20 with the PSTN 16 and MS 34 or fixed phone 32, a power up operation begins where power up phase operation code is sent from the factory setting module 26 to the CPU card 28 via bus 27. CPU card 28 responds by starting up and placing a registration call to service server 12. Once the registration process is successfully completed and microserver 20 is running, microserver 20 can receive information from the service server 12 or other service or corporation servers. When the service server 12 (or corporate server connected directly to internet 14) has information to be loaded into a specific user's microserver, it will establish a data call to that microserver. As stated earlier, this information can be advertisements, email, news, short-message-system (SMS), voice mail, or any other data that can be transferred over a data connection. When microserver 20 receives a service call, it will automatically answer the call (based on the calling number) and establish the PPP data connection between the CPU card 28 and service server 12. Once connected, the service information from service server 12 will be delivered into the memory of the microserver. Upon completion of the loading, the microserver can notify the user that there are messages or information waiting for them by illuminating a light displaying a text message, providing an audible notification, or any combination of these indications. This notification can be a user settable option (e.g., the user can set microserver to either notify them upon receipt of the service information, or could instruct microserver to store the information until the user attempts to use the MS 34 or fixed phone 32.

The data from the service server 12 or corporate servers can be transferred to the microserver 12 at any time. In other contemplated embodiments, microserver 20 may, upon receipt of new service information, take over the phone line to which it is connected and send the stored messages directly to the user while they are currently using MS 34. In another embodiment, a wireless application protocol (WAP) is used as the delivery mechanism for delivering service information when the mobile device MS 34 is used as a terminal.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An apparatus for providing information services to a telecommunication device of a user wherein at least one service provider is connected to a global network of computers and the global network of computers is connected to a communication network to which the user has access, the apparatus comprising:

a microserver disposed in a user selected location and connected to the communication network, said microserver comprising a communication protocol means for providing a connection between the microserver and the user's telecommunication device and means for automatically initiating communications between said microserver and the at least one service provider, said means for automatically initiating communications comprising means for contacting said at least one service provider using a handshake procedure to communicate registration information between said microserver and said at least one service provider and to register said microserver with said at least one service provider to indicate readiness to receive service information from said at least one service provider, said registration information comprising information relating to a location of said microserver, said microserver further comprising means for automatically receiving and storing service information from said at least one service provider, wherein said service information is based on said registration information, means for notifying the user of the presence of the received service information, and means for transmitting the service information from said at least one service provider to the user's telecommunication device via the global network of computers and the communication network.

2. The apparatus in accordance with claim 1, wherein the user's telecommunication device comprises at least one of a wireless mobile terminal and a wired fixed terminal, wherein said communication protocol comprises both a wireless protocol for providing a wireless connection between the microserver and a wireless mobile terminal and a communication jack for connecting the microserver to a wired fixed terminal.

3. The apparatus in accordance with claim 2, wherein said microsever further comprises:
an identifier for identifying a type of service information received from the at least one service provider; and
processing means connected to said identifier for processing the identified service information and determining to which of said wireless mobile terminal and said wired fixed terminal the identified service information is to be delivered.

4. The apparatus in accordance with claim 3, wherein said processing means comprises a modem for receiving data and fax service information and a central processing unit receiving signals from said modem and transmitting said received signals to at least one of said wireless communication protocol and said communication jack.

5. The apparatus in accordance with claim 3, wherein said processing means comprises a central processing unit card having a central processing unit, a memory and signal converters and processors for receiving transmitted service information in voice form and routing it to at least one of said wireless communication terminal and said wired fixed terminal.

6. The apparatus in accordance with claim 1, wherein said at least one service provider comprises at least one selected from a group consisting of retailers, advertisers, restaurants, voice mail providers, email providers, fax providers and internet providers.

7. The apparatus in accordance with claim 1, wherein said microserver further comprises a factory setting module for storing permanent settings of said microserver, said permanent setting comprising at least one selected from the group consisting of a startup code, a network service address and user information.

8. The apparatus in accordance with claim 2, wherein said wireless communication protocol comprises at one selected from a group consisting of bluetooth, wireless local area networks (WLAN) and wireless application protocol (WAP).

9. The apparatus of claim 1, wherein said registration information further comprises information relating to the user's personal preferences.

10. The apparatus of claim 1, wherein said at least one service provider is a retailer and said service information comprises information pertaining to the retailer.

11. The apparatus of claim 10, wherein said service information comprises advertisements.

12. The apparatus of claim 10, wherein said means for transmitting said service information comprises means for periodically transmitting said service information to the user's telecommunication device.

13. An apparatus for providing information services to a telecommunication device of a user comprising:
at least one service provider having a service server connected to a global network of computers;
a communication network connected to the global computer network; and
an interface connected to the communication network and the user telecommunication device for communicating with said at least one service provider, automatically receiving service information from said at least one service provider, storing the received service information, notifying the user of the presence of the received service information, and providing said service information to the user via the user's telecommunication device, said interface further comprising means for automatically initiating communications between said interface and said at least one service provider, said means for automatically initiating communications comprising means for contacting said at least one service provider using a handshake procedure to communicate registration information between said interface and said at least one service provider and to register said interface with said at least one service provider to indicate readiness to receive service information from said at least one service provider, wherein said registration information comprises information relating to a location of said interface and said service information is based on said registration information.

14. The apparatus in accordance with claim 13, wherein said communication network comprises one selected from a group consisting of a public switching telephone network; an integrated services digital network and an asymmetric digital subscriber line.

15. The apparatus in accordance with claim 13, wherein said interface comprises a microserver connected to said communication network to receive, store and transmit the service information from the service provider to the user.

16. The apparatus in accordance with claim 15, wherein the user's telecommunication device comprises a wireless mobile terminal and said interface comprises a communication protocol for providing a connection between said interface and the user's telecommunication device, said communication protocol comprising a wireless protocol for providing a wireless connection between said interface and said user's telecommunication device.

17. The apparatus in accordance with claim 16, wherein said microserver comprises:
an identifier for identifying the type of service information received from the service provider;
processing means connected to said identifier for processing the identified service information and determining to which of said wireless mobile terminal and said wired fixed terminal the identified service information is to be delivered;
a wireless communication protocol for providing a wireless connection between the microserver and the user's wireless mobile terminal; and
a communication jack connecting the microserver to a user's wired fixed terminal.

18. The apparatus in accordance with claim 17, wherein said processing means comprises a modem for receiving data and fax service information and a central processing unit receiving signals from said modem and transmitting said received signals to at least one of said wireless communication protocol and said communication jack.

19. The apparatus in accordance with claim 17, wherein said processing means comprises a central processing unit card having a central processing unit, a memory and signal converters and processors for receiving transmitted service information in voice form and routing it to at least one of said wireless communication terminal and said wired fixed terminal.

20. The apparatus in accordance with claim 17, wherein said wireless communication protocol comprises at one selected from a group consisting of bluetooth, wireless local area networks (WLAN) and wireless application protocol (WAP).

21. The apparatus of claim 15, wherein the user's telecommunication device comprises a wired fixed terminal and said interface comprises a communication protocol for providing a connection between said interface and the user's telecommunication device, said communication protocol comprising a communication jack connecting the microserver to the user's telecommunication device.

22. The apparatus in accordance with claim 13, wherein said at least one service provider comprises at least one selected from a group consisting of retailers, advertisers, restaurants, voice mail providers, email providers, fax providers and internet providers.

23. The apparatus in accordance with claim 13, wherein said microserver further comprises a factory setting module for storing permanent settings of said microserver, said permanent setting comprising at least one selected from the group consisting of a startup code, a network service address and user information.

24. The apparatus of claim 13, wherein said registration information further comprises information relating to the user's personal preferences.

25. The apparatus of claim 13, wherein said at least one service provider is a retailer and said service information comprises information pertaining to the retailer.

26. The apparatus of claim 25, wherein said service information comprises advertisements.

27. The apparatus of claim 25, wherein said means for transmitting said service information comprises means for periodically transmitting said service information to the user's telecommunication device.

28. An apparatus for providing information services to a telecommunication device user comprising:
at least one service provider having a service server connected to a global computer network;
a communication network connected to the global computer network; and
an interface disposed in user selected location and connected to the communication network and the user telecommunication device for communicating with said at least one service provider and automatically receiving and storing service information from said at least one service provider and providing said service information to the user via the user's telecommunication device, said interface comprising means for notifying the user of the presence of received service information, and said interface further comprising means for automatically initiating communications between said interface and said at least one service provider wherein the user telecommunication device comprises at least one of a wireless mobile terminal and a wired fixed terminal, said means for automatically initiating communications comprising means for contacting said at least one service provider using a handshake procedure to communicate registration information between said interface and said at least one service provider and to register said microserver with said at least one service provider to indicate readiness to receive service information from said at least one service provider, wherein said registration information comprises information relating to a location of said interface and said service information is based on said registration information, and said interface comprises:
an identifier for identifying the type of service information received from the service provider; and
processing means connected to said identifier for processing the identified service information and determining which of said wireless mobile terminal and said wired fixed terminal the identified service information is to be delivered.

29. The apparatus in accordance with claim 28, wherein said interface comprises a microserver connected to the communication network to receive, store and transmit the service information from the service provider to the user.

30. The apparatus in accordance with claim 29, wherein said microserver further comprises:
a wireless communication protocol for providing a wireless connection between the microserver and the user's wireless mobile terminal; and
a communication jack connecting the microserver to a user's wired fixed terminal.

31. The apparatus in accordance with claim 30, wherein said processing means comprises a modem for receiving data and fax service information and a central processing unit receiving signals from said modem and transmitting said received signals to at least one of said wireless communication protocol and said communication jack.

32. The apparatus in accordance with claim 30, wherein said processing means comprises a central processing unit card having a central processing unit, a memory and signal converters and processors for receiving transmitted service information in voice form and routing it to at least one of said wireless communication terminal and said wired fixed terminal.

33. The apparatus in accordance with claim 30, wherein said microserver further comprises a factory setting module for storing permanent settings of said microserver, said permanent setting comprising at least one selected from the group consisting of a startup code, a network service address and user information.

34. The apparatus in accordance with claim 30, wherein said wireless communication protocol comprises at one selected from a group consisting of bluetooth, wireless local area networks (WLAN) and wireless application protocol (WAP).

35. The apparatus in accordance with claim 28, wherein said at least one service provider comprises at least one selected from a group consisting of retailers, advertisers, restaurants, voice mail providers, email providers, fax providers and internet providers.

36. The apparatus of claim 28, wherein said registration information further comprises information relating to the user's personal preferences.

37. The apparatus of claim 28, wherein said at least one service provider is a retailer and said service information comprises information pertaining to the retailer.

38. The apparatus of claim 37, wherein said service information comprises advertisements.

39. The apparatus of claim 37, wherein said means for transmitting said service information comprises means for periodically transmitting said service information to the user's telecommunication device.

40. A method for providing services from a service provider to a user's telecommunication device, the service provider connected to a data network, the data network being connected to a telecommunication network providing service to the user's telecommunication device, said method comprising the steps of:
connecting an interface device to the telecommunication network at a user selected location, the interface device having a processor and memory for receiving and storing information;
automatically initiating communication, by the interface device, with the service provider and providing registration information from the interface device to the service provider after said step of connecting, the registration information including at least the location of the user selected location;

transmitting a service, by the service provider, to the user's telecommunication device;

receiving and storing the service at the interface device; and notifying the user, by the interface device, of the presence of the received service.

41. The method of claim 40, wherein said step of notifying comprises sending a prompt to the user's telecommunication device.

42. The method of claim 41, wherein said step of sending a prompt comprises sending the prompt prior to the placement of a call on the user's telecommunication device.

43. The method of claim 41, wherein said step of sending a prompt comprises sending the prompt after a call is completed on the user's telecommunication device.

44. The method of claim 41, wherein said step of sending a prompt comprises sending a prompt to the telecommunication device by a wireline connection.

45. The method of claim 41, wherein said step of sending a prompt comprises sending a prompt by a wireless connection.

46. The method of claim 40, wherein said step of notifying comprises notifying the user's telecommunication device by a wireline connection.

47. The method of claim 40, wherein said step of notifying comprises notifying the user's telecommunication device by a wireless connection.

48. The method of claim 40, further comprising the steps of determining whether the user wants to receive the service and sending the service to the user's telecommunication device when it is determined that the user wants to receive the service.

49. The method claim 48, wherein the step of determining comprises receiving at the interface device an instruction from the user's telecommunication device indicating the user's desire to receive the service.

50. The method of claim 48, wherein the step of sending the service comprises sending the service to the user's interface by a wireline connection.

51. The method of claim 50, wherein the step of sending the service comprises sending the service to the user's interface by a wireless connection.

52. The method of claim 48, further comprising the step of providing, by the service provider, additional benefits to the user for using the interface device.

53. The method of claim 40, wherein the at least one service provider is a retailer and the service is a message containing information pertaining to the retailer.

54. The method of claim 53, wherein the service information comprises an advertisement.

55. The method of claim 53, wherein said step of transmitting a service comprises periodically transmitting the service to the user's telecommunication device.

* * * * *